United States Patent
Josephian

[15] 3,656,768
[45] Apr. 18, 1972

[54] PISTON AND RING THEREFOR

[72] Inventor: William Josephian, 2311 Magonlia Street, Oakland, Calif. 94607

[22] Filed: Jan. 20, 1970

[21] Appl. No.: 4,230

[52] U.S. Cl.................................277/167, 92/172, 277/203
[51] Int. Cl.........................................................F16j 9/04
[58] Field of Search.................277/167, 203, 168, 196, 216, 277/220, 168, 236; 92/172

[56] References Cited

UNITED STATES PATENTS

| | | | |
|---|---|---|---|
| 1,433,937 | 10/1922 | Clew et al. | 277/203 |
| 2,809,080 | 10/1957 | Mittell et al. | 277/203 X |
| 2,871,072 | 1/1959 | Parks et al. | 277/203 X |
| 3,134,602 | 5/1964 | Wilson | 277/203 |
| 2,460,431 | 2/1949 | Phillips | 277/196 |

FOREIGN PATENTS OR APPLICATIONS 506,839   6/1939   Great Britain...........................277/203

Primary Examiner—Edward J. Earls
Attorney—Joseph B. Gardner

[57] ABSTRACT

A piston and compression ring therefor useful in high pressure gas compressors and expanders having self-lubricated rings. The ring is relatively narrow in its axial dimension and has an angular length from end to end thereof in excess of 360, one end portion of the ring being offset axially so as to overlap the other end portion thereof and reinforce the same. The piston provides a circumferential ring groove that is enlarged axially over an angular length sufficient to seat such offset overlapping end portion of the ring therein; and the ends of the groove as defined by the axial enlargement thereof and the respectively cooperative portions of the ring are in close proximity and are all parallel so as to prevent the ring from rotating but permit it to expand as it wears without increasing the likelihood of leakage therepast.

5 Claims, 3 Drawing Figures

PATENTED APR 18 1972
3,656,768
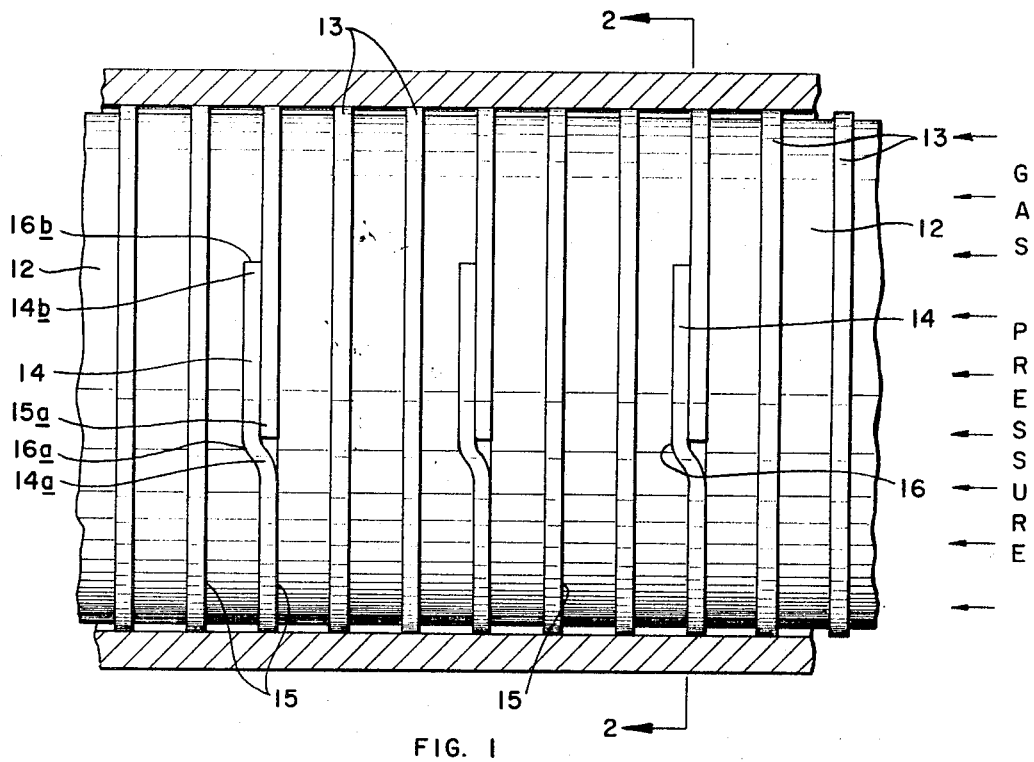
FIG. 1
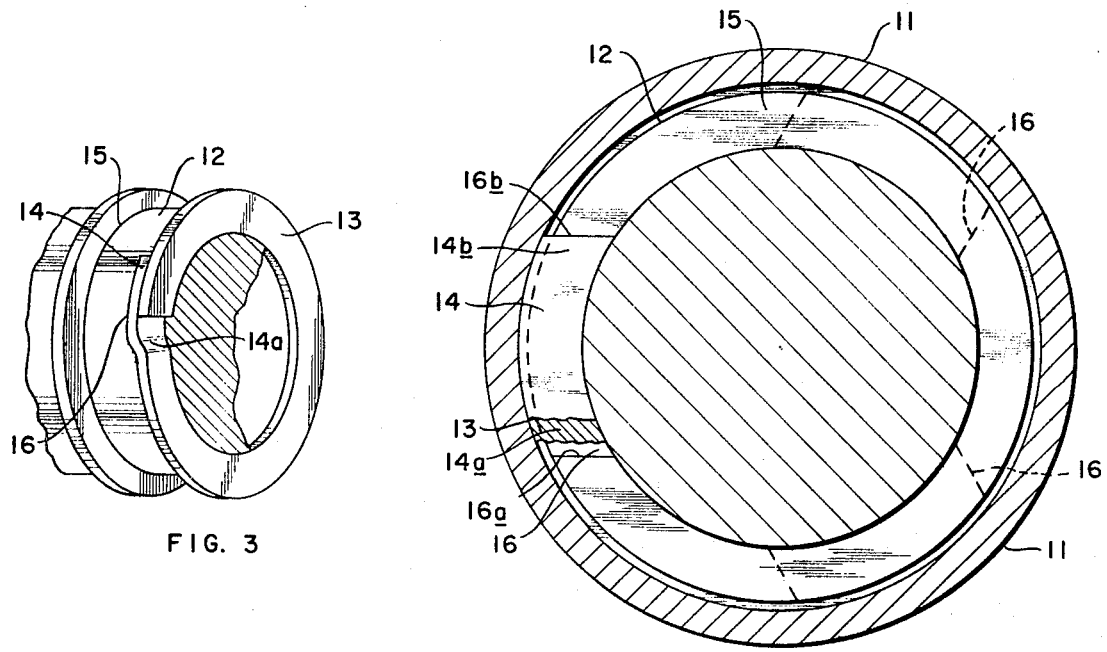
FIG. 3
FIG. 2
INVENTOR:
WILLIAM JOSEPHIAN
BY: *Joseph B. Gardner*
ATTORNEY

PISTON AND RING THEREFOR

This invention relates to a piston and ring therefor and, more particularly, to a piston and ring assembly for reciprocable receipt within a cylinder structure to slideably engage the walls thereof and define a pressure seal therewith. The invention is especially useful in gas compressors in which gaseous fluids are compressed to relatively high pressure values and in reciprocable expanders in which high pressure gases are expanded to much lower pressure values to reduce the temperature to cryogenic ranges.

In gas compressors and expanders of the type being considered, the rings thereof are known as self-lubricated rings and run dry so as to avoid oil contamination, and as a consequence the pressure-seal augmentation obtained in conventionally lubricated piston-cylinder structures as a result of the presence of a thin oil film between the piston and circumjacent cylinder wall is lost. Also, however, the rings wear very rapidly because of the absence of a lubricating media, and it is not unusual for a ring to wear up to a quarter of an inch during its short operating life which under ideal conditions is generally restricted to from 1,200 to 3,000 hours. As a consequence of such wear and the high pressures to which the rings are subjected (often in the range of from 2,000 psi to 3,000 psi), the practice is to make the rings thick in the axial direction (about three-eighths of an inch, for example) in order to provide sufficient strength to withstand the high gaseous pressure forces.

I have discovered that the use of thick piston rings accelerates ring wear and theorize that the substantial axial surface engagement of each ring with the circumjacent cylinder wall prevents significant pressure leakage or blow-by between the contiguous surfaces of the ring and cylinder. As a consequence, there is no active pressure force acting in opposition to the high gaseous pressure force operative within the piston groove which urges the ring outwardly into exceedingly tight frictional engagement with the cylinder wall and thereby increasing the rate of wear thereof.

The present invention constitutes an entirely different approach to the problems of prevention of leakage past a piston ring versus long life thereof, and generally stated such approach includes the use of thin or narrow rings arranged so that there are no unsupported areas which would break because of ring weakness, especially after substantial wear thereof. In structural terms, the invention includes a cylindrical piston having a plurality of narrow circumferential grooves spaced axially along the outer wall thereof, and a plurality of narrow piston rings respectively disposed within the grooves provide relatively gas-tight fits between the piston and circumjacent walls of the cylinder in which they operate. Each ring and the groove therefor are especially configurated to constrain the ring from angular displacements and to provide the same with reinforcement throughout the entire length thereof. Further, each ring fits closely to the effective ends of the groove so that little leakage occurs thereat.

An object, among others, of the present invention is to provide an improved piston and ring assembly, and in particular, an assembly that is especially adapted for use without lubrication in high pressure gas compressors and expanders although in no way restricted to such use. Another object of the invention is to provide a piston and ring assembly that accommodates or compensates for ring wear with substantially no diminution of the effectiveness of the seal defined thereby.

Still another object of the invention is in the provision of an improved ring and piston in which the ring has a long operation life without breakage. A further in object of the invention is that of providing a piston and ring arrangement therefor in which the work of establishing a pressure seal between the piston and cylinder in which it operates tends to be distributed among a number of rings rather than concentrated in one ring as is common in conventional high pressure compressor and expander devices. These and other objects and advantages of the invention will become apparent hereinafter.

An embodiment of the invention is illustrated in the accompanying drawing in which:

FIG. 1 is a side view in elevation of a piston and ring assembly of the present invention shown within a cylinder therefor which is illustrated in section;

FIG. 2 is a cross-sectional view of the assembly of FIG. 1 taken along the plane indicated by the line 2—2 of FIG. 1; and FIG. 3 is a broken perspective view, on a reduced scale, of the piston and ring assembly shown in FIGS. 1 and 2.

The piston and ring assembly of the present invention is adapted to fit within a cylinder 11 of usual construction and since there is nothing specialized in the construction of the cylinder itself, it will not be further described. The piston 12 of the present invention, as is customary, has a slightly smaller diameter than that of the cylinder 11 so as to be freely reciprocable therein. The piston 12 is provided with a plurality of axially spaced circumferential grooves 15 each of which, throughout most of its length, has a width suitable to receive a complementary piston ring 13 therein with a close fit. The ring 13, as particularly shown in FIGS. 1 and 3, is somewhat longer in angular length from end to end thereof than the circumference of the cylinder 11 and piston 12, and one end portion of the ring is offset relative to the other end portion thereof, as shown at 14 in FIGS. 1 and 3.

The offset end portion 14 of the ring 13 has the same circumferential curvature as the entire balance thereof and is offset only the thickness of the ring which otherwise defines a common plane. The lower side or face of the offset portion 14 lies essentially against the upper side or face of the opposite end portion of the ring. An angular neck 14a connects the offset end portion 14 of the ring to the balance thereof, and the location of the neck 14a must be so related to the adjacent end 15a of the ring that the ring can be compressed sufficiently to fit within the cylinder 11, as shown in FIGS. 1 and 2. This construction provides that there is no break in the circumference of the ring 13 abutting the cylinder wall 11, and at one location there are two thicknesses of ring slidably engaging the inner wall in the cylinder.

Each groove 15 in the piston 12 has a width substantially corresponding to the thickness of the ring 13 except for a section 16 of the groove which has an axial width sufficient to receive the two thicknesses of the ring throughout the angular length in which they overlap and abut each other, as shown in the drawing. The offset, overlapping end portion 14 of the ring may have a thickness that is equal to, less than, or even more than the thickness of the ring; and in the embodiment illustrated the ring is of uniform axial thickness from end to end thereof. As an example in a piston having an outer diameter of approximately 5.20 inches, the groove 15 may have a width of five-sixteenths of an inch which is increased by one-eighth of an inch at the offset 16. The ring for such groove has an axial width of nine sixty-fourths of an inch. Such offset portions 16 are angularly spaced around the piston 12, as shown particularly in FIG. 2 by broken lines, such that the offset portion 16 of each groove is spaced in opposite directions at angles of 120° from the immediately adjacent grooves on its opposite sides. Thus, the offset 16 of every third groove are in angular alignment.

The ends 16a and 16b of each groove 15 are located at the ends of the offset 16 thereof, and they are substantially parallel to each other, as shown in FIG. 2, instead of being radially disposed. The portions of each ring 13 that respectively cooperate with the groove ends 16a and 16b are the neck 14a and the end or terminal edge 14b, and these portions respectively parallel the adjacent ends 16a and 16b of associated groove 15 in close proximity thereto — a clearance of the order of 0.002 to 0.003 of an inch usually being provided. The opposite end 15a of the ring 15 underlies the offset end portion 14 thereof adjacent the neck 14a and is substantially parallel thereto.

The groove ends 16a and 16b may be identical or may differ one from the other as shown in the drawing. In this reference, the ends may each be formed at right angles as is the case of the end 16b, or they may be formed with a radius as in the case of the end 16a. Forming each of the ends 16a and 16b with a slight radius (one-eighth of an inch, for example) may be somewhat less expensive than machining them to a right angle since the enlargement 16 can be fabricated on a milling machine using a rotating cutter having a diameter of one-fourth of an inch. In any case, the respectively correspondingly ends 14a and 14b of the ring offset 14 must be shaped to correspond essentially to the configuration of the adjacent groove ends 16a and 16b.

As indicated hereinbefore, since the reciprocable engagement of the rings 13 with the circumjacent walls of the cylinder 11 is not lubricated, the rings are conventionally formed of a material having some inherent lubricity, and typical example is a material comprising Teflon which provides the lubricity and an additive such as brass (other examples being carbon and glass) to provide the ring with a degree of strength. Such a ring is relatively soft and weak, and with the relatively small axial dimensions indicated (i.e., approximately one-eighth of an inch which is about one-third the thickness of ordinary rings), the rings would be subject to considerable breakage. However, in the configuration shown in the drawing, each ring 13 is supported throughout its entire angular length so that there is no unsupported area that would be highly prone to breakage.

More particularly in this respect, the high value gaseous pressure forces act against the piston 12 from right to left as viewed in FIG. 1 in the direction of the arrows associated with the legend "gas pressure." In the case of gas compressor, the piston 12 will move from left to right as viewed in FIG. 1 to compress the gaseous fluids to the high pressures desired, and in the case of an expander, the gaseous pressure forces will act against the (one-eight 12 to displace it toward the left which results in the gases doing work to reduce surface pressure thereof (by way of example, a pressure reduction from about 2,300 psi down to about 70 psi). In either event, the gaseous pressure forces act against the rings 13 and tend to displace the same from right must left, as seen in FIG. 1, and it will be observed that each ring 13 is reinforced or buttressed throughout its entire length either by the underlying surface of the groove 15 or, in the case of the free end portion of the ring, by the underlying surface of the offset end portion 14. Accordingly, there is no unsupported ring area which could break because of the high value pressure forces acting against the ring if such an unsupported area were present. Further, as the rings wear and therefore expand radially outwardly to compensate therefor, the free end portion of each ring simply moves relative to the fixed end portion 14 thereof, but such relative movement does not result in the development of an unsupported ring area.

Also as a result of the described construction, as a ring 13 expands to take up the wear, the effective end portions 14a and 14b of the ring remain in close proximity with the groove ends 16a and 16b thereby tending to prevent leakage of fluid between the ends of the rings and grooves. The offset end 14 of the ring is confined within the enlarged or offset portion 16 of the groove 15 so that the ring cannot be displaced angularly which continuously maintains the rings in their original relative orientations. However, the offset 14 can move radially outwardly (and inwardly) without changing the close fit of the ring portions 14a and 14b with the respectively adjacent ends 16a and 16b of the groove. Thus, as wear of a ring occurs, it expands or enlarges and the offset portion 14 thereof moves radially outwardly in the enlargement 16 of the groove, but because of the parallel relationship and close fit as heretofore described, no significant change in the sealing quality of the cooperative sealing relationship of the piston and ring takes place.

Reducing the thickness of the rings 13 enables a greater number of rings to be provided along the piston 12 in the same axial length thereof. As a typifying example, in an axial piston length of about 8 inches, the number of rings can be increased from about seven or eight to 12. However, since each ring is relatively narrow in axial dimension, some leakage or blow-by occurs past a substantial number of the rings but the blow-by progressively decreases in magnitude from ring to ring in a diminishing order from right to left as viewed in FIG. 1 because the pressure gradient decreases from ring to ring in that direction. This leakage or blow-by is desirable because it results in a pressure force being active between the substantially contiguous surfaces of various of the rings and the cylinder wall, which pressure force tends to counteract the high value pressure force present within each ring groove 15 and urging the ring 13 therein outwardly into tight frictional engagement with the cylinder wall.

The ring 13 at the extremity of the right hand end of the piston 12 will have the maximum pressure force acting thereagainst and, at the same time, the counteracting pressure force present within the associated groove 15 will approximate such maximum pressure value. The next successive ring will have a somewhat lesser pressure value acting thereagainst since the maximum pressure value will be reduced by the amount of the pressure drop across the first ring 13. The pressure active against each ring will diminish in value from ring to ring until a point is reached at which substantially no blow-by occurs, and in each instance the value of the pressure force operative within the groove 15 of any particular ring 13 will substantially approximate the value of the pressure acting axially upon such ring. Accordingly, an automatic adjustment of the values of the active and counteracting pressure forces occurs from ring to ring. In any case, the wear experienced by each ring 13 is diminished substantially over that present in conventional devices, and as a result, the life of such device before ring replacement is required is significantly increased, and it is believed that in the usual instance such increase at least doubles the useful life of the compressor or expander device.

The construction shown also avoids the necessity of carefully milling the two abutting ends of the usual piston ring, of carefully milling overlapping slots in one end of a ring to fit a tongue in the opposite mating end, or of providing other similar constructions found the the art which have been provided in an effort to avoid leakage of gas around a piston ring.

It will be understood that the drawings and the above disclosure disclose the preferred embodiment of my invention, and that some modifications will occur to those skilled in the art which will not depart from the invention herein disclosed. Accordingly, it is intended that the appended claims cover such modifications as fall within the true spirit and concept of the invention.

What is claimed is:

1. The combination of an axially reciprocable piston and a piston ring therefor, said ring being of substantially greater angular length from end to end thereof than the circumference of said piston, one end portion of said ring being axially offset with respect to the other end portion thereof and disposed in overlapping adjacency therewith, said piston having a groove thereabout in which said ring is mounted, said groove having at one location therealong an axial enlargement complementary in axial width and angular extent to the overlapping end portions of the ring so as to accommodate the same, and the terminal ends of said enlargement being substantially parallel and the respective terminal edges of said offset end portion of said ring being in close proximity therewith.

2. The combination of claim 1 in which said ring is a self lubricated ring structurally weak and relatively narrow in axial dimension, said ring being supported from end to end thereof within said groove so that no high value pressure forces present within a cylinder in which said piston and ring operate can act against an unsupported ring area to cause breakage thereat.

3. The combination of claim 1 in which the terminal edges of said offset end portion are substantially parallel to the respectively adjacent ends of said enlargement, and in which said terminal edges and enlargement ends are sub-stantially parallel to the axis of reciprocation of said piston.

4. The combination of claim 3 in which the aforesaid one end portion of said ring is offset bodily with respect to the entire balance thereof which defines a common plane, the axial enlargement of said groove being in one direction only.

5. The combination of claim 1 in which said piston is provided with a plurality of grooves each having a ring mounted therein, the enlarged portions of certain of said grooves being angularly displaced with respect to another.

* * * * *